US008488472B2

(12) United States Patent
Morris et al.

(10) Patent No.: US 8,488,472 B2
(45) Date of Patent: Jul. 16, 2013

(54) AUTOMATED CABLE IDENTIFICATION AND VERIFICATION SYSTEM

(75) Inventors: Terrel Morris, Richardson, TX (US); Colin E. Brench, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2106 days.

(21) Appl. No.: 11/359,645

(22) Filed: Feb. 22, 2006

(65) Prior Publication Data

US 2007/0195711 A1 Aug. 23, 2007

(51) Int. Cl.
*H04J 1/16* (2006.01)
(52) U.S. Cl.
USPC .......................... 370/240; 370/242; 370/248
(58) Field of Classification Search
USPC .............. 340/500, 540, 686.1, 687; 370/241, 370/240, 242, 248, 251
See application file for complete search history.

(56) References Cited

U.S. PATENT DOCUMENTS

| 2,776,405 | A | * | 1/1957 | Moore et al. | 324/415 |
|---|---|---|---|---|---|
| 5,603,619 | A | * | 2/1997 | Turner et al. | 439/69 |
| 6,545,445 | B1 | * | 4/2003 | McDermott et al. | 320/103 |
| 7,072,995 | B1 | * | 7/2006 | Burroughs | 710/16 |
| 7,852,780 | B1 | * | 12/2010 | Eslambolchi et al. | 370/250 |
| 2003/0084359 | A1 | * | 5/2003 | Bresniker et al. | 713/324 |
| 2005/0073503 | A1 | * | 4/2005 | Fudali et al. | 345/173 |
| 2005/0209877 | A1 | * | 9/2005 | Moroney et al. | 705/1 |
| 2007/0016312 | A1 | * | 1/2007 | Redmond et al. | 700/22 |

FOREIGN PATENT DOCUMENTS

CN 1629973 6/2005

OTHER PUBLICATIONS

Chinese Office Action, not translated, dated Dec. 6, 2010, 6 pages.

* cited by examiner

*Primary Examiner* — Andrew Lee (57) ABSTRACT

A method for configuring components in a networked computer system comprising providing a configuration map that includes installation locations and sequences for network components. The configuration map is used to indicate component installation locations and sequences through a series of indicators. The component installation locations and sequences are confirmed after the components are configured according to the configuration map by an electrical connectivity test of each affected component.

20 Claims, 7 Drawing Sheets

FIG.5A a# AUTOMATED CABLE IDENTIFICATION AND VERIFICATION SYSTEM

BACKGROUND

Computer systems can be networked through an interconnection of cables to provide increased communication, memory capacity and operating flexibility. Building, managing, and re-configuring the cable connections of a networked computer system is a complex task that may involve cable wiring diagrams, labeled cables, and connector reference designators. The task becomes increasingly complex with an increasing number of cables, connections and possible configurations, to the point where it is extremely difficult to effectively manage the cables, connections and configurations of the networked system in the traditional manner.

BRIEF DESCRIPTION OF THE DRAWINGS

For a detailed description of exemplary embodiments of the invention, reference will now be made to the accompanying drawings in which:

FIG. 4A-B shows a flow chart of a method for automated upgrade or replacement of a network system component in accordance with an exemplary embodiment of the present invention; and FIG. 5A-B shows a flow chart of a method for automated reconfiguration of a network system component in accordance with an exemplary embodiment of the present invention.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
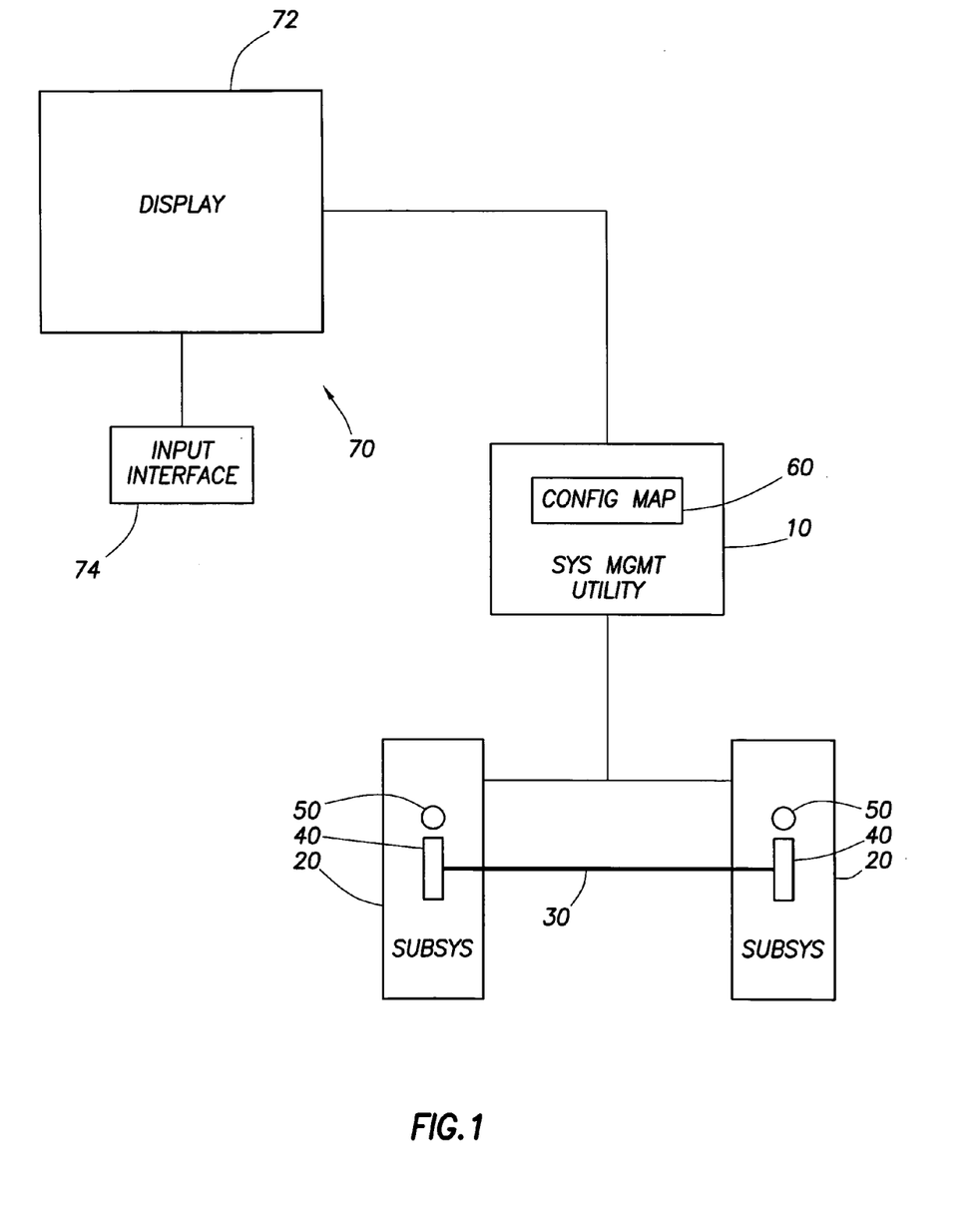
FIG. 1 shows a schematic block illustration of a system for automated verifying and identifying of computer system component connection locations and sequences in accordance with an exemplary embodiment of the present invention.

FIG. 1 is a schematic illustration of one embodiment of various computer system component connections that may be used in embodiments of the present invention. A system management utility 10 is provided, along with a plurality of network subsystems 20, cables 30, cable connectors 40, and indicators 50. System management utility 10 is loaded with, or has access to, a firmware configuration map 60, which comprises instructions that contain a desired connection configuration for computer system components such as cables 30 with regard to network subsystems 20. In general, the system management utility comprises executable software that performs some, or all, of the functionality described herein. In this embodiment, firmware configuration map 60 provides the instructions and roadmap for how network subsystems 20 are to be interconnected by cables 30 inserted on each opposite end into cable connectors 40 that are integrated into each network subsystem 20.

In alternative embodiments, firmware configuration map 60 may direct how other computer system components are connected with respect to network subsystems 20. For example, in addition to, or instead of, cables 30 as the computer system components, firmware configuration map 60 may provide connection information with respect to network subsystems 20 for computer system components including but not limited to network card/boards, processors, and I/O devices.

Firmware configuration map 60 may further provide the sequence in which instructions for interconnecting network subsystems 20 should be executed. The sequence information present in firmware configuration map 60 serves as guided directions to help automate the connection in a desired order of several cables 30 between specific cable connectors 40 associated with network subsystems 20.

System management utility 10 may be connected with user interface 70 via point-to-point connections and a private Local Area Network (LAN). User interface 70 may include user display 72 and input interface 74. In some embodiments, user interface 70 may comprise a processor, user display 72 may be a PC monitor, and user interface 74 may be a mouse and/or keyboard. The system management utility generally comprises code provided in storage (e.g., a hard disk drive) and executed by a processor.

System management utility 10 may be used to direct the identification and sequence for connecting computer system components such as cables 30 with respect to network subsystems 20. Firmware configuration map 60 has stored therein various programmed network subsystem 20 connection configurations desired for a given application. User interface 70 allows a user to select the desired configuration from firmware configuration map 60, which then directs indicators 50 to activate at a desired location and/or in a desired sequence to prompt user to make the appropriate the network subsystem 20 connection according to the selected firmware configuration map 60. In certain embodiments, indicators 50 may comprise one or more light emitting diodes (LEDs). Alternatively, indicators 50 may comprise a digital console, or in a further alternative embodiment may comprise an audible indicator.

In some embodiments, after the prompted connection is made, system management utility 10 activates a connectivity test among the computer system components connected with respect to network subsystems 20 using diagnostic circuitry to verify that the connection locations and/or sequences previously made were completed according to firmware configuration map 60. If the connection is erroneous, broken, or was made out-of-sequence, then system management utility 10 responds and either activates the indicator 50 at the connection location in a continuous or flashing manner, meaning that the connection task must either be corrected or repeated. If the connection is made properly according firmware configuration map 60, the indicator is deactivated, and system management utility 10 advances to the next connection direction in the selected firmware configuration map 60.

Figure 2:
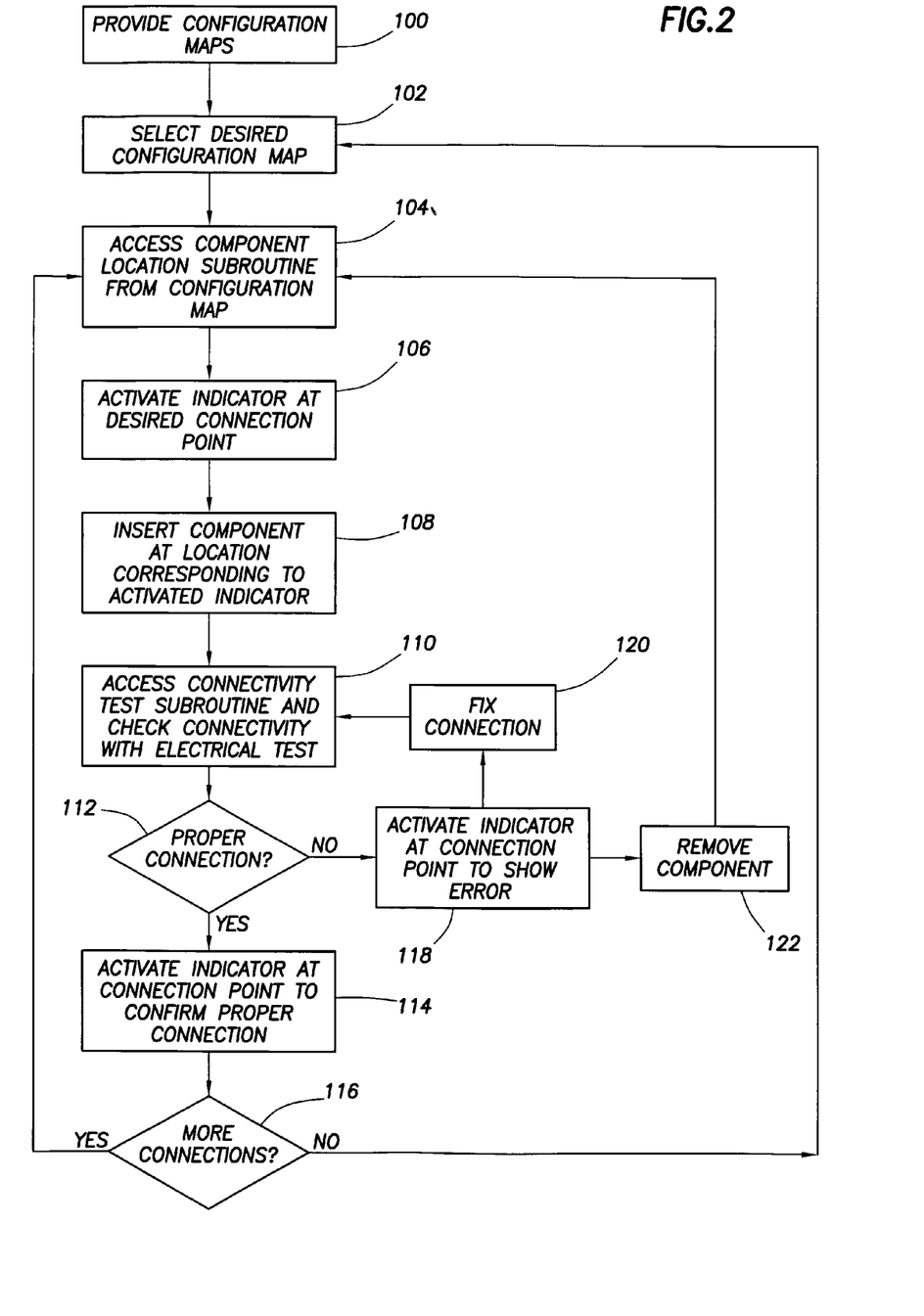
FIG. 2 shows a flow chart of a method for assembling network components and then verifying correct network component assembly in accordance with an exemplary embodiment of the present invention.

One computer system component connection task, which is an embodiment according to the present invention, involves assembling cables in a configured-to-order arrangement provided by a firmware configuration map and verifying that the cables are ultimately connected in the desired configuration. FIG. 2 is a flow chart of a method for assembling cables according to a firmware configuration map and then subsequently verifying the cable assembly. In a step 100, a system management utility is provided with at least one firmware configuration map. In a step 102, the desired firmware configuration map is accessed and selected through a system management utility interface. The firmware configuration map has two subroutines, which are available through the system management utility interface: one subroutine for indicating the desired cable connection location (i.e., the indicator subroutine), and a subroutine designed for checking cable connectivity via electrical testing (i.e., the connectivity subroutine).

In a step 104, the indicator subroutine is accessed from the active firmware configuration map. When the indicator subroutine is prompted, it activates the indicators located near the connectors that are to be cable-connected pursuant to the firmware configuration map in a step 106. The indicator in the present embodiment is an LED light source. One embodiment involves assigning color codes to the LED light source during the indicator subroutine (such as yellow) and additionally flashing the LED light source to further direct the desired cable connection configuration. In a step 108, the ends of a network cable are inserted at the connector locations identified by the activated indicators.

The connectivity subroutine is then accessed and activated in a step 110, which initiates an electrical test to determine whether a valid connection has been made for the desired cable connection path according to the active firmware configuration map, and that the desired cable connection path has been maintained for a sufficient period of time. In a step 112, if the proper connectivity is confirmed, a message is sent to the system management utility, and in a step 114, the indicators at the connection points of interest are directed to change state. In one embodiment, the indicator is again an LED light source, and a successful connectivity test results in the LED light source illuminating a steady green colored light.

In a step 116, the indicator subroutine searches for more cable connections present in the active firmware configuration map. If more cable connections within the active firmware configuration map are identified, the method returns to step 104 where the indicator and connectivity subroutines are repeated for each cable connection in the firmware configuration map. Further, when there are no additional cable connections identified in the active firmware configuration map, the method returns to step 102 to access a different firmware configuration map loaded in the system management utility.

If, during step 112, the connectivity test determines that a proper cable connection has not been made according to the active firmware configuration map, the indicator at the erroneous connection point is activated to show the incorrect connection in a step 118. The activation of the indicator can mean either that the cable was not properly inserted such that a workable electrical connection was formed, or that the cable was inserted at the wrong location. Upon notification of an incorrect connection, the operator has the option of proceeding to a step 120, in which the connection is fixed so that a proper electrical connection is made, and returning to step 110 to run the connectivity test again. Alternatively, the operator may choose to remove the affected cable in a step 122, and return to step 104 to restart the indicator subroutine.

Another embodiment of the present invention provides a method for the automated reconnection of network components according to a desired firmware configuration map after the components have been disconnected in order to remove and replace a network subsystem while the network remains in operation (i.e., a hot swap). In a preferred embodiment, the component requiring reconnection is a network cable and the network subsystem being replaced is a network board. The end of the cable requiring reconnection has been disconnected from a connector mounted on the board identified for replacement, while the other end of the cable remains attached to an unaffected network board. The selected board is replaced in a procedure referred to as a "hot swap" because the network system remains in operation while the affected cable end is disconnected and the board is removed and replaced.

Figure 3:
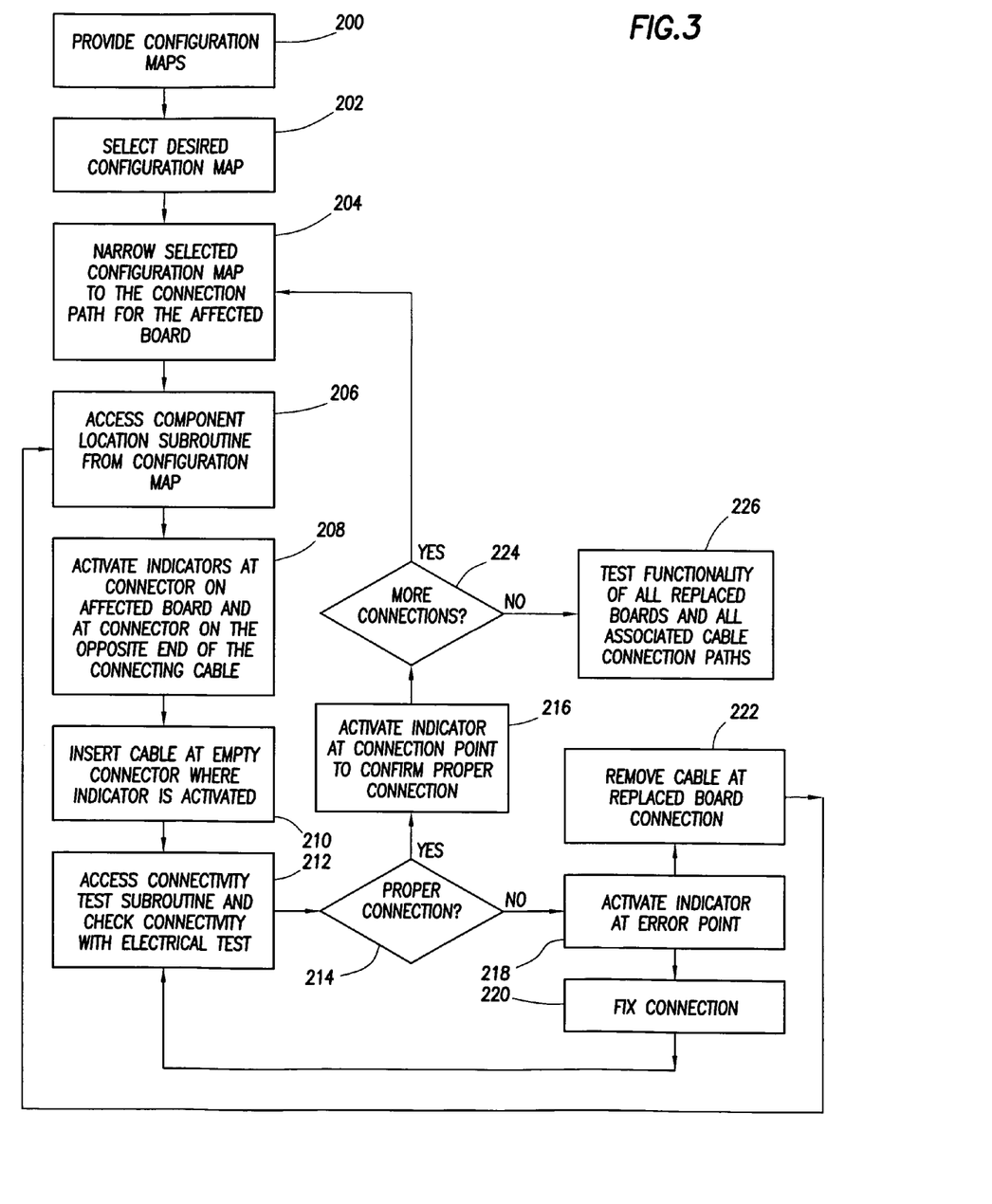
FIG. 3 shows a flow chart of a method for guided disassembly and reconnection of network components while the network remains in operation in accordance with an exemplary embodiment of the present invention.

FIG. 3 is a flow chart of a method for the guided reconnection of a network cable while the network remains in operation. In a step 200, a system management utility is provided with at least one firmware configuration map. A firmware configuration map is selected that provides the desired cable connection configuration through the system management utility interface in a step 202. The selected firmware configuration map is narrowed to the cable-connection path related to the recently replaced board in a step 204.

The indicator subroutine of the active firmware configuration map is accessed in a step 206 then and prompted in a step 208 to activate an indicator located at the cable reconnection location associated with the replaced board. Additionally, an indicator is activated at the connection point for the opposite end of the affected cable. The activation of indicators at the fixed end of an affected cable and the desired reconnection point further guides the operator during the reconnection process. The indicator in this embodiment is an LED light source. One further aspect of the present embodiment involves assigning color codes to the LED light source during the indicator subroutine (such as yellow) and additionally flashing the LED light source to further direct the desired cable connection configuration. The cable is reconnected at the location corresponding to the activated indicator in a step 216, typically at the empty connector on the replaced board.

In a step 212, the connectivity subroutine of the active firmware configuration map is accessed, which initiates an electrical test to determine whether a valid connection has been made for the desired cable connection path, and that the desired connection path has been maintained for an established period of time. If the proper connectivity is confirmed in a step 214, a message is sent to the system management utility and the indicator is directed to change its state in a step 216. In one embodiment, the indicator is an LED light source, and a successful connectivity test results in the LED light source illuminating a steady green color light.

If, during step 214, the connectivity test determines that according to the active firmware configuration map an improper cable connection has been made, the indicator at the erroneous connection point changes state to show the incorrect connection in a step 218. The state change of the indicator can mean either that the cable was not properly inserted such that a workable electrical connection was formed, or that the cable was inserted at the wrong location. Upon notification of an incorrect connection, the operator has the option of proceeding to a step 220, in which the connection is fixed so that a proper electrical connection is made, and returning to step 212 to run the connectivity test again. Alternatively, the operator may choose to remove the affected cable in a step 222, and return to step 206 to restart the indicator subroutine.

In a step 224, the indicator subroutine searches for additional cable reconnection points that are required in the active firmware configuration map. If more reconnection points within the active firmware configuration map are identified, the method returns to step 204 where the firmware configuration map is again narrowed to the affected cable connection path. The indicator and connectivity subroutines are repeated for each affected cable connection path in the firmware configuration map affected by a board replacement, and further for each varied firmware configuration map loaded in the system management utility. If no additional required cable reconnections are detected in step 224, the system management utility tests the functionality of all the affected boards and associated cable connection paths replaced as a result of the hot swap in a step 226.

Another embodiment of the present invention involves a method for the automated or guided removal and installation of network components, followed by a verification of affected network component connection configurations that are utilized in highly available (HA) systems or in scaleable multiprocessor (SMP) systems. HA systems are designed to incorporate failover and re-route paths between interconnected redundant system components. In a HA system, if one of the redundant components fails, the interconnection between the components allows the system to failover to another operable component. Cable form the interconnects in a HA system, and therefore must be accurately identified during replacement and upgrade procedures to prevent crashing the entire system.

Similarly, SMP systems are designed to incorporate failover and re-route paths, which allow for ease of upgrade and expansion. SMP consist of a system architecture where multiple processors are interconnected and operate as a single system. The interconnection between processors is accomplished through cables, again highlighting the importance of accurately selecting cable connections for modification. The configurability of an SMP system is complicated by the cabled systems as cables will need to be moved, disconnected, and reconnected during the addition of network subsystems or other manners of reconfiguration.

Figure 4A:
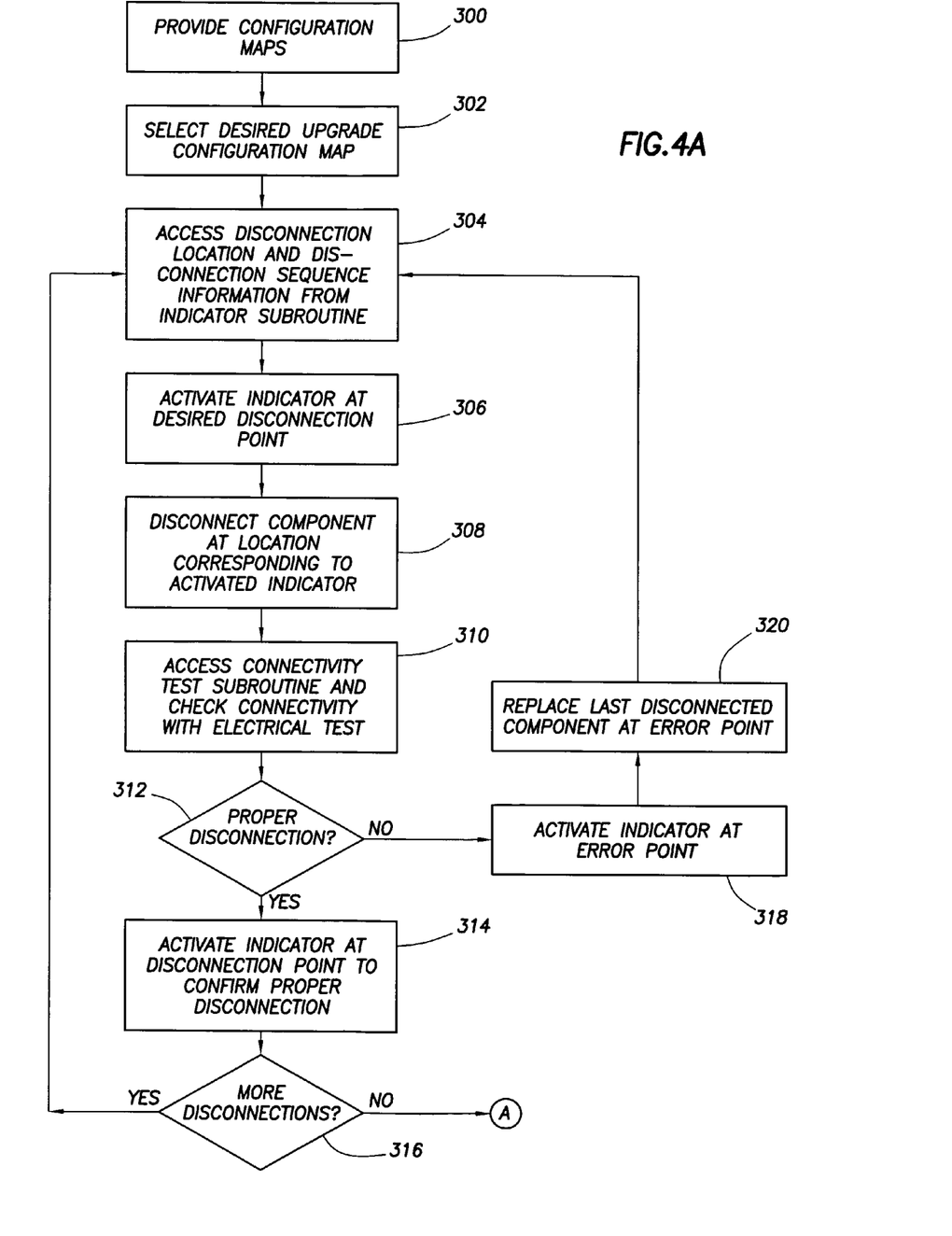
Figure 4B:
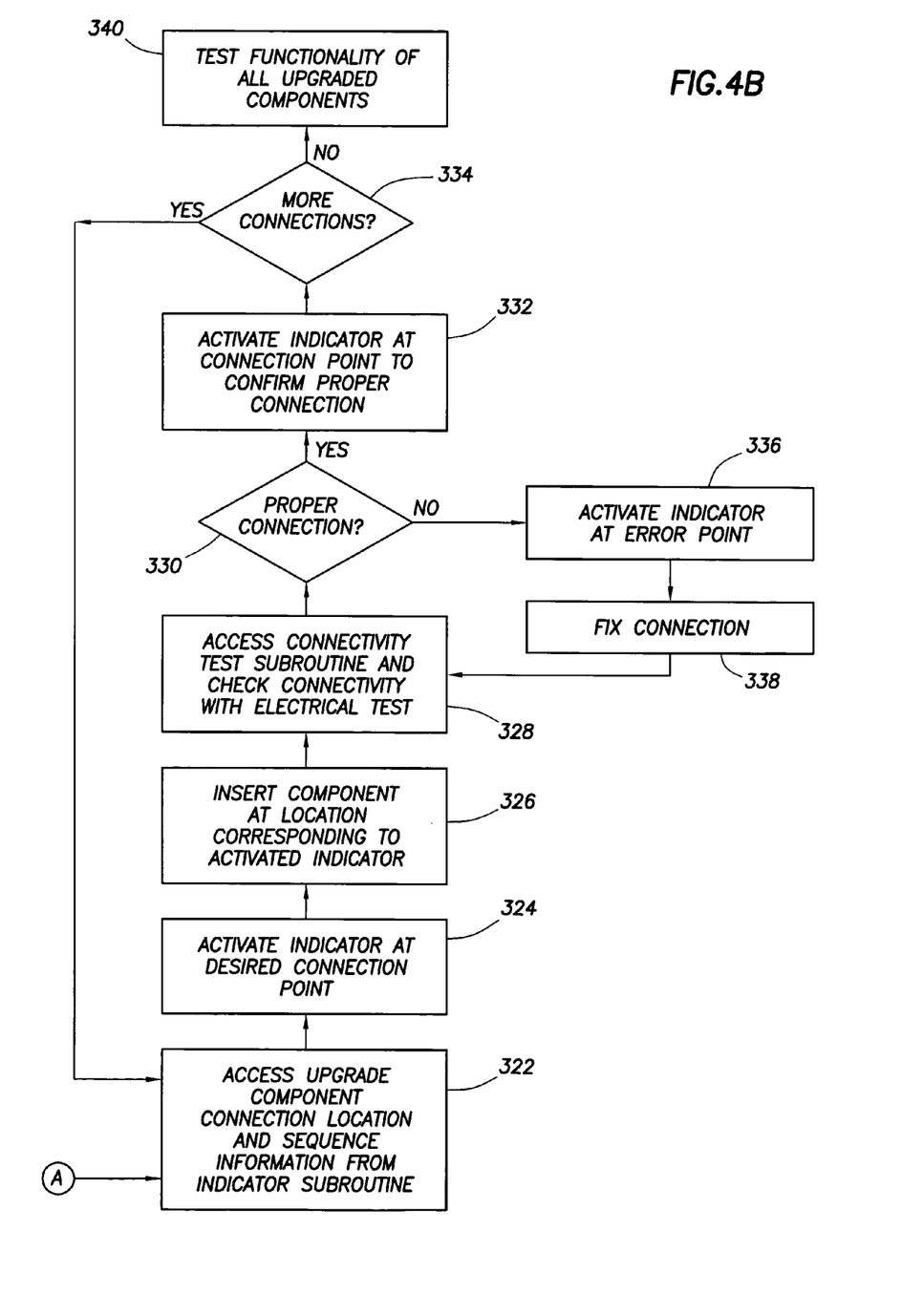
Figure 5A:
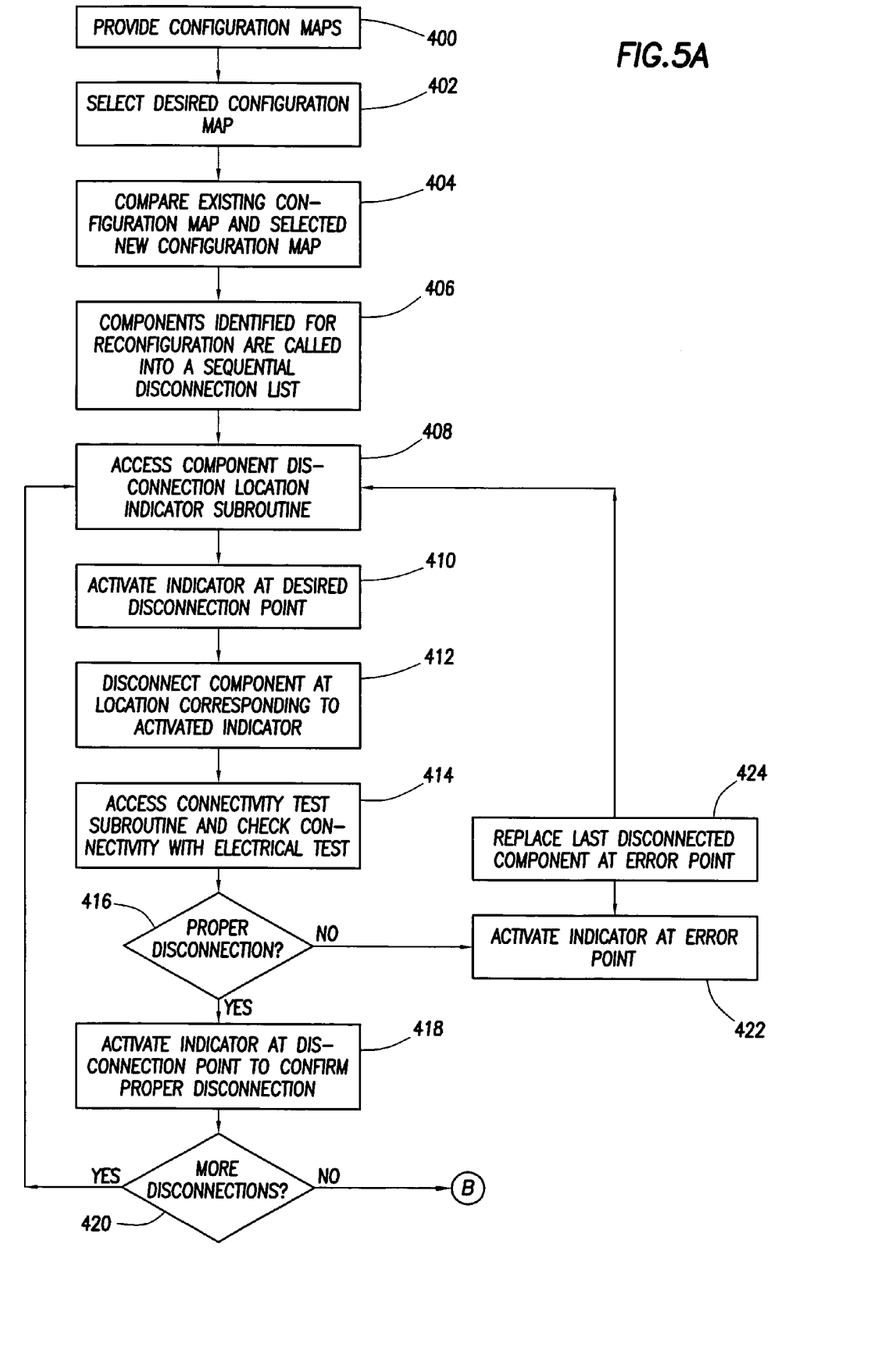
Figure 5B:
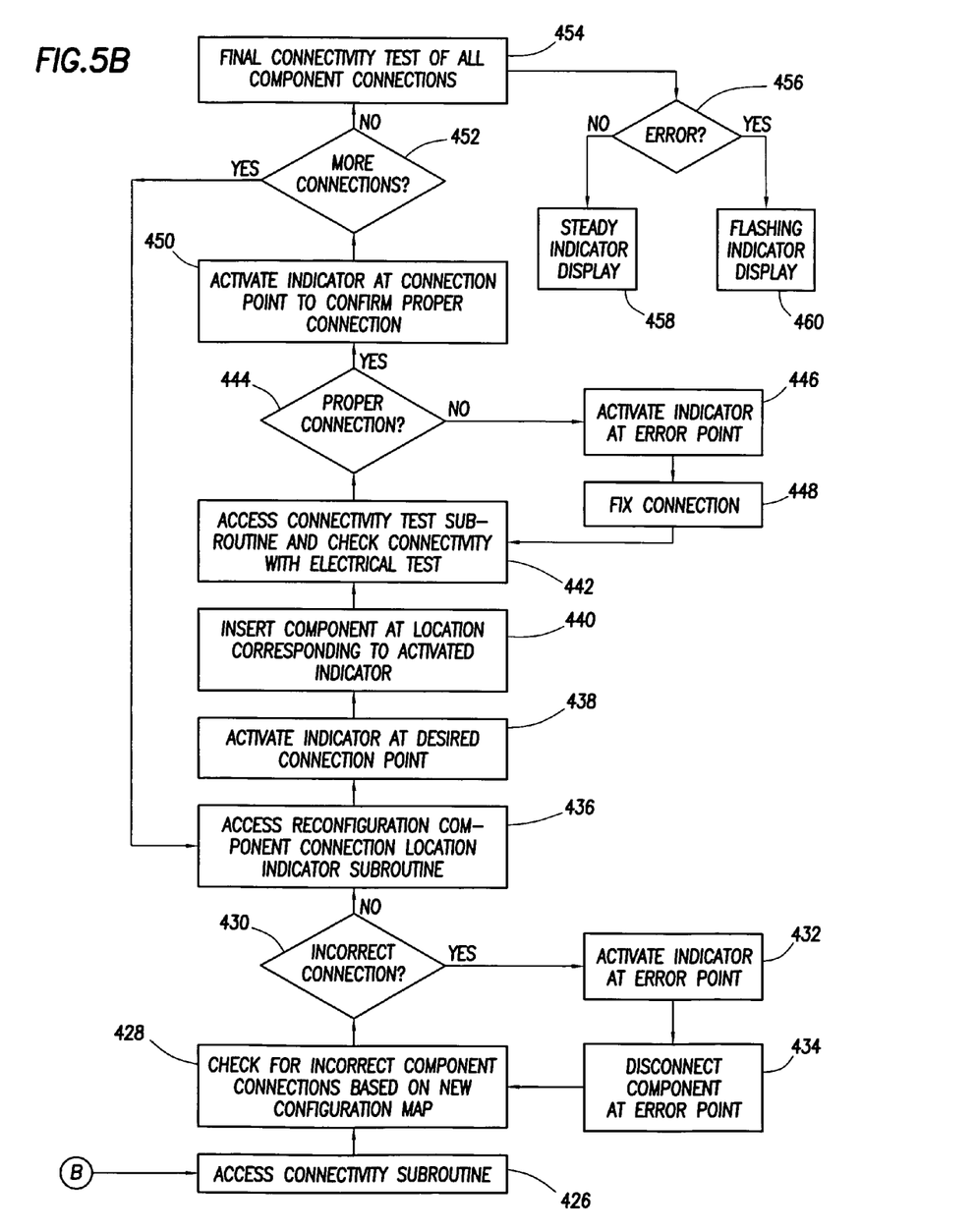

In the framework of a HA system or SMP system, a scenario may arise where there is a need to disconnect a cable to enable the upgrade or replacement of the cable or other existing network system components with newer versions of the same components, and then reconnect the cable. In the framework of a SMP system, a scenario may arise where the fundamental cable connectivity configuration needs to be altered to facilitate a network system reconfiguration. In both scenarios, it is important to correctly deal with cable connections in order to avoid crashing the entire associated system. A method for dealing with the upgrade/replacement scenario is shown in the flow chart depicted in FIG. 4A-B. A method for dealing with the reconfiguration scenario is shown in the flow chart depicted in FIG. 5A-B.

Referring now to FIG. 4A-B, a flow chart of a method for the automated or guided upgrade or replacement of a cabled network system is shown. In an embodiment according to the present invention, the system management utility is provided with at least one firmware configuration map in a step 300. The system management utility is placed in an upgrade function and an upgrade firmware configuration map is selected in a step 302. The system management utility then accesses disconnection location and sequence information from the indicator subroutine of the active firmware configuration map in a step 304.

In a step 306, the indicator subroutine causes the indicator at the disconnection location to become illuminated. In the present embodiment, the indicator subroutine directs the LED light source at the cable disconnection location to flash and display yellow. The operator disconnects the cable end identified for disconnection by the activated indicator in a step 308. The connectivity test subroutine is the accessed in a step 310 and initiates an electrical connectivity test at the cable disconnection location. When the connectivity test establishes that the correct cable has been disconnected in a step 312 in accordance with the disconnection location and sequence instructions, and that the disconnection has been maintained for a sufficient period of time, the system management utility is alerted. The system management utility directs the indicator subroutine to change the indicator at the cable disconnection location in a step 314 to indicate a proper cable disconnection.

If the connectivity test in run in step 310 determines in step 312 that the cable disconnection was performed improperly, the connectivity subroutine messages the management utility, which directs the indicator subroutine to activate the indicator at the cable connection location to indicate the error by an alternative indicator display in a step 318. In the present embodiment, the error is indicated by the LED light source at the erroneous connection point is illuminated a steady red color. The operator then replaces the last cable disconnected in error at the connection point where the error indicator is illuminated in a step 320. The process repeats upon reconnection of the improperly disconnected cable beginning again with step 304.

The system management utility then determines if there are more cable locations identified for disconnection by the active firmware configuration map in a step 316. If more disconnection locations are identified, the method returns to step 304 and the subsequent steps detailed above are repeated until all cables identified for disconnection have been properly disconnected. The system components associated with the disconnected cables may then be safely removed and replaced as the upgrade firmware configuration map or reconfiguration map requires.

When the connectivity subroutine identifies no additional cable disconnection locations in step 316, the system management utility accesses the cable connection location indicator subroutine from the upgrade firmware configuration map in a step 322. The indicator subroutine activates the indicator cue located at the desired connection point in a step 324. In the present embodiment, the indicator cue is an LED that flashes yellow to indicate both connectors associated with a given cable for the desired cable connection path. In a step 326, the operator is then directed to insert the cable end at the indicated connection location(s).

In a step 328, the system management utility accesses the connectivity subroutine and performs and electrical test to check for a proper connection for a given cable connection path. If the connectivity subroutine determines that a valid connection has been made and maintained for a sufficient time in a step 330, the connectivity subroutine alerts the system management utility, which then directs the indicator subroutine to activate the indicator cue at the confirmed connection point in a step 332. In the present embodiment, the indicator cue is an LED which is illuminated a steady green color to indicate a proper connection.

If, during step 330, the connectivity test determines that a proper cable connection has not been made according to the active firmware configuration map, the indicator cue at the erroneous connection point is activated to show the incorrect connection in a step 336. In the present embodiment, an LED is used as the indicator cue, and is directed to flash red at the improper connection point. The indicator can mean either that the cable was not properly inserted such that a workable electrical connection was formed, or that the cable was inserted at the wrong location. Upon notification of an incorrect connection, the operator is directed to proceed to a step 338, in which the connection is fixed so that a proper electrical connection is made, and then returning to step 328.

Once the present connection is indicated as correctly made in step 332, the system management utility determines is more connections are required by the active firmware configuration map in a step 334. If additional connections are identified, the system management utility returns to step 322. If no additional connections are identified by the system management utility in step 334, the system management utility tests the functionality of all the components installed as a result of the upgrade in a step 340.

Referring now to FIG. 5A-B, a flow chart of a method for the automated or guided reconfiguration of a cabled network system is shown. The reconfiguration involves a fundamental cable connectivity alteration and an associated re-mapping of the configuration guidelines. It is desirable that the reconfiguration is conducted in a way that minimizes network system disruption with respect to cables configuration paths that are changed and cable configuration paths that remain unaffected.

In an embodiment according to the present invention, the system management utility is provided with at least one firmware configuration map in a step 400. The system management utility is placed in a reconfiguration function and a new firmware configuration map is selected in a step 402. An "old" firmware configuration map is known by the management utility and was used to configure the network system in its current state. The management utility then compares the new and old firmware configuration maps in a step 404 to identify the differences between the two configurations and to discover which cables must be changed.

In a step 404, the cables to be changed are identified and called into a sequential list for disconnection. The sequential list for disconnection is then correlated with two subroutines embedded in the selected firmware configuration map: the indicator subroutine and the connectivity subroutine. The indicator subroutine is accessed in a step 408. In a step 410, the indicator subroutine causes the indicators associated with the connectors at both ends of the cable to become illuminated if both ends of the cable are to be disconnected. Alternatively, the indicator subroutine may only direct the indicator associated with one of the connectors to be illuminated if only one cable end is to be disconnected. In the present embodiment, the indicator subroutine directs the LED light source indicator at the cable connection location desired to be disconnected to flash and display yellow. The operator disconnects the cable end identified for disconnection by the activated indicator in a step 412.

The connectivity test subroutine is then accessed in a step 414 and directs electrical connectivity tests to be run on the cable connection locations identified for disconnection. When the connectivity test establishes that the correct cable has been disconnected in accordance with the new firmware configuration map in a step 416, and that the disconnection has been maintained for a valid period of time, the connectivity subroutine messages the management utility, which directs the indicator subroutine to change the indicator at the cable connection location in a step 418. In the present embodiment, the LED light source indicator is illuminated the color green to indicate that the proper component has been disconnected.

If the connectivity test in run in step 414 determines in step 416 that the cable disconnection was performed improperly, the connectivity subroutine messages the management utility, which directs the indicator subroutine to activate the indicator at the cable connection location to indicate the error by an alternative indicator display in a step 422. In the present embodiment, the error is indicated by the LED light source at the erroneous connection point is illuminated a steady red color. The operator then replaces the last component disconnected in error at the connection point where the error indicator is illuminated in a step 424. The process repeats upon reconnection of the improperly disconnected component beginning again with step 408.

The system management utility then determines if there are more component locations identified for disconnection by the active firmware configuration map in a step 420. If more disconnection locations are identified, the method returns to step 408 and the subsequent steps detailed above are repeated until all cables identified for disconnection have been properly disconnected. The system components associated with the disconnected cables may then be safely removed and replaced as the upgrade firmware configuration map or reconfiguration map requires.

When the connectivity subroutine identifies no additional cable disconnection locations in step 420, the system management utility accesses the connectivity subroutine for the new firmware configuration map in a step 426. The connectivity subroutine directs an electrical test of all component connections in a step 428 in order to identify any incorrect connections based on the new firmware configuration map. If an incorrect component connection is identified in a step 430, the connectivity subroutine alerts the system management utility, which in turn directs the indicator subroutine to activate the indicator cue at the error point in a step 432. In the present embodiment, when an incorrect component connection is detected, the indicator cue is made to flash the color red. The indicator cue continues to flash red until the operator disconnects the improperly connected component in a step 434. The system management utility then directs the connectivity subroutine to test component connections again in a repeat of step 428.

When the connectivity test in step 430 identifies no incorrect component connections, the system management utility accesses the component connection location indicator subroutine from the new firmware configuration map in a step 436. The indicator subroutine activates the indicator cue located at the desired connection point in a step 438. In the present embodiment, the indicator cue is an LED that flashes yellow to indicate both connectors associated with a given cable for the desired cable connection path. In a step 440, the operator is then directed to insert the component at the indicated connection location(s).

In a step 442, the system management utility accesses the connectivity subroutine and performs and electrical test to check for a proper connection for a given cable connection path. If the connectivity subroutine determines that a valid connection has been made and maintained for a sufficient time in a step 444, the connectivity subroutine alerts the system management utility, which then directs the indicator subroutine to activate the indicator cue at the confirmed connection point in a step 450. In the present embodiment, the indicator cue is an LED which is illuminated a steady green color to indicate a proper connection.

If, during step 444, the connectivity test determines that a proper cable connection has not been made according to the active firmware configuration map, the indicator cue at the erroneous connection point is activated to show the incorrect connection in a step 446. In the present embodiment, an LED is used as the indicator cue, and is directed to flash red at the improper connection point. The indicator can mean either that the component was not properly inserted such that a workable electrical connection was formed, or that the component was inserted at the wrong location. Upon notification of an incorrect connection, the operator is directed to proceed to a step 448, in which the connection is fixed so that a proper electrical connection is made, and then returning to step 442.

Once the present connection is indicated as correctly made in step 450, the system management utility determines is more connections are required by the active firmware configuration map in a step 452. If additional connections are identified, the system management utility returns to step 436. If no additional connections are identified by the system management utility in step 452, the system management utility accesses the connectivity subroutine and commences a final electrical test of all new component connections against the new firmware configuration map in a step 454. If a connection error is identified by the connectivity subroutine in a step 456, the system management utility is alerted, and the indicator subroutine is directed to activate the indicator cue at the improper connection point in a step 460. In the present embodiment, the indicator cue is directed to flash red until the improper connection is removed.

If no connection errors are identified in step 456, all indicator cues associated with the affected component connections are activated in a step 458. In the present embodiment, the indicators are steady green when all components have been tested and verified as correctly connected.

The above discussion is meant to be illustrative of the principles and various embodiments of the present invention. Numerous variations and modifications will become apparent to those skilled in the art once the above disclosure is fully appreciated. For example, the methods described in this application largely deal with network cable connections and configurations. However, this invention contemplates that the automated identification and verification system is adaptable to other network system components, such as card components. It is intended that the following claims be interpreted to embrace all such variations and modifications.

What is claimed is:

1. A method for configuring a component in a computer system, comprising:
   indicating an installation location and an installation sequence for the component according to a configuration map through the activation of a first indicator;
   installing the component at the installation location corresponding to the first indicator;
   performing an electrical connectivity test of the component; and
   confirming the installation of the component in accordance with the installation location and the installation sequence of the configuration map through the activation of a second indicator.

2. The method of claim 1 wherein the component comprises a cable.

3. The method of claim 2 wherein the cable is connected between at least two network subsystem connectors.

4. The method of claim 1 wherein the first indicator and second indicator comprise an LED light source.

5. The method of claim 1 wherein the first indicator and second indicator comprise a digital console.

6. The method of claim 1 wherein the component is reconnected within a connection path of a replaced network subsystem.

7. The method of claim 6 further comprising narrowing the configuration map to the connection path of the replaced network subsystem.

8. The method of claim 6 further comprising testing the functionality of the replaced network subsystem and the connection path.

9. The method of claim 1, further comprising testing all of the connections of the component via the electrical connectivity test.

10. The method of claim 1, wherein the installation sequence specifies an order of installation for a plurality of components to be installed in the computer system.

11. A method for the automated disconnection of a component in a network computer system and the automated connection of an upgrade component, comprising:
    accessing a stored configuration map that contains a desired connection configuration for the computer system and determining therefrom a component removal location and a component removal sequence;
    indicating the component removal location according to the component removal sequence through the activation of a first indicator;
    removing the component from the network computer system at the component removal location corresponding to said first indicator;
    performing an electrical connectivity test at the component removal location;
    confirming the proper removal of the component in accordance with the component removal location and the component removal sequence through the activation of a second indicator;
    accessing the stored configuration map and determining therefrom a component upgrade location and a component upgrade sequence;
    indicating the component upgrade location according to the component upgrade sequence through the activation of a third indicator;
    installing the upgrade component at the component upgrade location corresponding to said third indicator;
    performing an electrical connectivity test of the upgrade component; and
    confirming the installation of the upgrade component in accordance with the component upgrade location and the component upgrade sequence through the activation of a fourth indicator.

12. The method of claim 11 wherein the component and the upgrade component is a cable.

13. The method of claim 11 wherein the component and the upgrade component is a cable-connected board.

14. The method of claim 11 wherein the component and the upgrade component is a network card.

15. The method of claim 11 wherein the first indicator, the second indicator, the third indicator, and the fourth indicator comprise an LED light source.

16. The method of claim 11, further comprising indicating improper removal of the component in accordance with the component removal location and the component removal sequence by the activation of a fifth indicator.

17. A method for the automated reconfiguration of a component of a computer system from operation under a first configuration map to operation under a second configuration map, comprising:

comparing the first configuration map and the second configuration map, the first configuration map contains a first desired connection configuration for the computer system and the second configuration map contains a second desired connection configuration for the computer system;

identifying the component for reconfiguration;

calling the component into a sequential disconnection list comprising a disconnection location for the component;

indicating the disconnection location for the component according to the sequential disconnection list through a first indicator;

disconnecting the component at the disconnection location corresponding to the first indicator;

performing an electrical connectivity test of the disconnection location;

confirming the disconnection of the component in accordance with the sequential disconnection list with a second indicator;

indicating a connection location for the component according to the second configuration map through a third indicator;

installing the component at the connection location;

performing an electrical connectivity test of all of the connections of the component at the connection location; and     confirming the installation of the component at the connection location in accordance with the second configuration map with a fourth indicator.

18. The method of claim 17 wherein the component comprises a cable.

19. The method of claim 17 wherein the first indicator, the second indicator, the third indicator, and the fourth indicator comprise a LED light source.

20. The method of claim 17, further comprising indicating improper removal of the component at the disconnection location by the activation of a fifth indicator.

* * * * *